(12) United States Patent
Murotani et al.

(10) Patent No.: US 6,321,346 B1
(45) Date of Patent: Nov. 20, 2001

(54) EXTERNAL STORAGE

(75) Inventors: Akira Murotani, Odawara; Toshio Nakano, Chigasaki; Hidehiko Iwasaki, Hiratsuka; Kenji Muraoka, Odawara, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/421,235

(22) Filed: Oct. 20, 1999

Related U.S. Application Data

(63) Continuation of application No. 08/738,590, filed on Oct. 29, 1996.

(30) Foreign Application Priority Data

Oct. 30, 1995 (JP) .................................................. 7-282072

(51) Int. Cl.⁷ ............................ H02H 3/05; G06F 15/173
(52) U.S. Cl. ............................... 714/9; 714/11; 714/14; 714/47; 709/239; 709/242
(58) Field of Search .................................. 714/9, 13, 11, 714/12, 10, 47, 48, 15, 21; 709/239, 242

(56) References Cited

U.S. PATENT DOCUMENTS

| | | | |
|---|---|---|---|
| 4,141,066 | * | 2/1979 | Kelles .................................. 364/119 |
| 4,817,091 | | 3/1989 | Katzman et al. ........................ 371/9 |
| 4,991,174 | | 2/1991 | Mori et al. ........................... 371/15.1 |
| 5,016,244 | | 5/1991 | Massey, Jr. .............................. 370/16 |
| 5,091,847 | | 2/1992 | Herbermann ........................ 395/575 |
| 5,134,619 | | 7/1992 | Henson et al. ...................... 371/40.1 |
| 5,134,712 | * | 7/1992 | Yamamoto ............................ 395/800 |
| 5,274,645 | | 12/1993 | Idleman et al. ..................... 371/10.1 |
| 5,313,584 | | 5/1994 | Tickner et al. ....................... 395/275 |
| 5,546,535 | * | 8/1996 | Stallmo et al. .................. 395/182.07 |
| 5,557,735 | * | 9/1996 | Pinkston, II et al. ................ 395/180 |
| 5,566,297 | * | 10/1996 | Devarakonda et al. ........ 395/182.13 |
| 5,583,987 | * | 12/1996 | Kobayashi et al. ............. 395/182.11 |
| 5,644,700 | * | 7/1997 | Dickson et al. ................ 395/182.07 |
| 5,699,510 | * | 12/1997 | Petersen et al. ................ 395/185.07 |
| 5,790,775 | * | 8/1998 | Marks et al. .................... 395/182.07 |
| 5,928,367 | * | 7/1999 | Nelson et al. ........................... 714/6 |
| 6,052,795 | * | 4/2000 | Murotani et al. ........................ 714/3 |

OTHER PUBLICATIONS

A. Bhide et al., "A highly available network file server", USENIX, pp. 199–204.
IBM Technical Disclosure Bulletin, "Graceful Degrading in a Multiple Data Path Environment", vol. 16 No. 3, Aug. 1973, New York, NY., pp. 1–3.

* cited by examiner

*Primary Examiner*—Norman M. Wright
(74) *Attorney, Agent, or Firm*—Antonelli, Terry, Stout & Kraus, LLP

(57) ABSTRACT

In an external storage, an I/O process is continued without any intervention of a user or a host system at failure of a controller. When a failure occurs in a controller, a host system 10 recognizes the failure of the controller. Before the failure is notified to the user and application to stop the job, the substitutive controller reads the SCSI-ID possessed by an SCSI port of the failed controller from a shared memory, registers the SCSI-ID of the SCSI port to the SCSI port associated with the substitutive controller, and erases by a port address resetting facility 45 of the substitutive controller the SCSI-ID possessed by an SCSI port of the failed controller. Thanks to the provision, since the SCSI-ID specified at issuance of an I/O request is transferred between the controllers, the user or the host system need not alter the I/O request issuing route. Moreover, while the host system does not recognize the error, the transfer can be conducted.

16 Claims, 7 Drawing Sheets

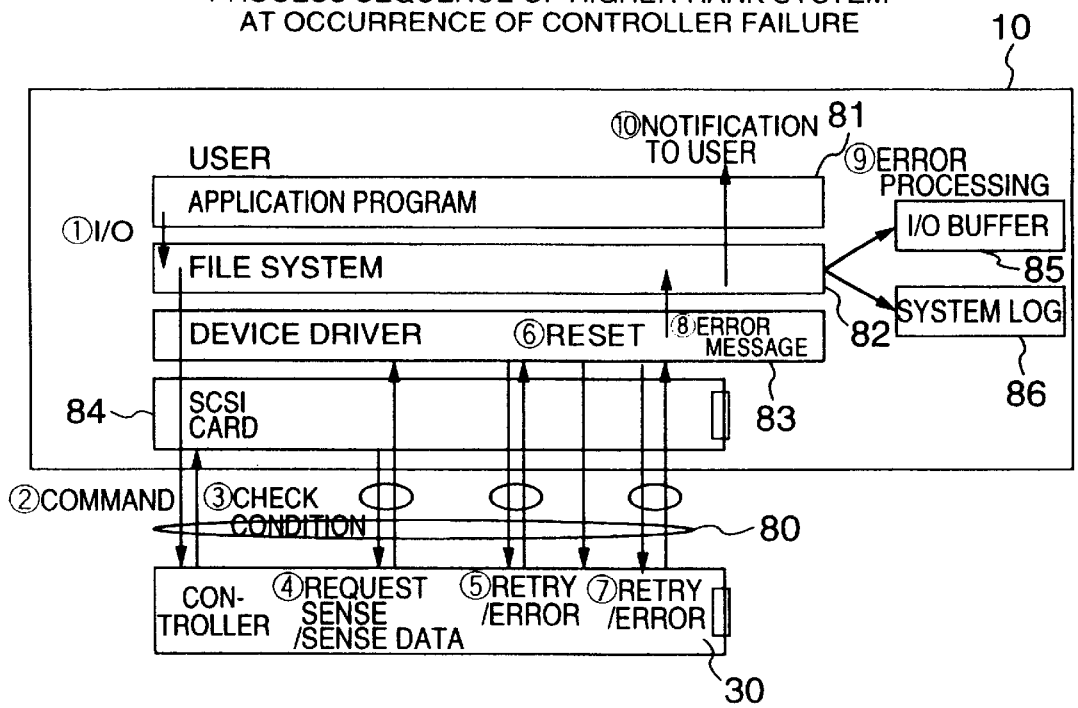

FIG.2

PROCESS SEQUENCE OF HIGHER-RANK SYSTEM AT OCCURRENCE OF CONTROLLER FAILURE

① APPLICATION ISSUES I/O REQUEST

② ISSUE COMMAND

③ CHECK CONDITION (ERROR) ⎫
④ ISSUE REQUEST SENSE ⎬ ONLY WHEN RESPONSE IS POSSIBLE FOR FAILURE DETECTED BY CONTROLLER
  /TRANSMIT SENSE DATA ⎭

⑤ EXECUTE RETRY — ( WHEN CONDITION ③ RELATED TO CONTROLLER IS IMPOSSIBLE, EXECUTE RETRY AFTER DEVICE DRIVER MONITORS STATE FOR A PREDETERMINED PERIOD OF TIME )
  (ABOUT THREE TIMES)

⑥ ISSUE ABORT COMMAND TO I/O DEVICE

⑦ ISSUANCE OF RETRY ENDS WITH ERROR

⑧ NOTIFY PERMANENT ERROR TO FILE SYSTEM

⑨ ERASE DATA IN I/O BUFFER AND SAVE ERROR CONTENTS IN SYSTEM LOG

⑩ NOTIFY ERROR VIA APPLICATION TO USER

FIG.3

CLASSIFICATION OF PROCESSES ACCORDING
TO DISK SUBSYSTEM STATES
(WHEN CONTROLLER 30 OF FIG.1 IS IN FAILURE)

| STATE OF FAILED CONTROLLER | PURPOSE OF PROCESS | USAGE STATE OF SCSI BUS | SCSI-ID TRANSFER PROCESS |
|---|---|---|---|
| I/O REQUEST FROM HOST SYSTEM NOT ACCEPTED | PREVENT FAILED CONTROLLER 30 FROM ACCEPTING I/O REQUEST AND EXECUTE TRANSFER OF SCSI-ID BY NORMAL SYSTEM 40 | FREE (SCSI BUS) | NORMAL CONTROLLER 40 EXECUTES INITIATOR OPERATION TO SELECT FAILED CONTROLLER 30 AND TO PREVENT FAILED CONTROLLER 30 FROM ACCEPTING I/O REQUEST. DURING THIS OPERATION, EXECUTE AND COMPLETE ADDITION OF SCSI-ID TO NORMAL SCSI PORT AND RESETTING OF FAILED SCSI PORT |
| | | USED BY NORMAL CONTROLLER 40 | SINCE FAILED CONTROLLER 30 CAN ACCEPT I/O REQUEST FROM HOST SYSTEM 10 WHILE NORMAL CONTROLLER 40 IS USING SCSI BUS, EXECUTE AND COMPLETE ADDITION OF SCSI-ID TO NORMAL SCSI PORT AND RESETTING OF FAILED SCSI PORT WHILE NORMAL CONTROLLER 40 IS EXECUTIING I/O |
| | | USED BY ANOTHER SCSI DEVICE (USAGE OF BUS OF FAILED CONTROLLER 30 CANNOT BE DISCRIMINATED) | EXECUTE ADDITION OF SCSI-ID TO NORMAL SCSI PORT AND RESETTIING OF FAILED SCSI PORT AFTER LAPSE OF BUS MONITOR TIME<br><br>[ANOTHER DEVICE]<br>TRANSFER SCSI-ID DURING I/O OF SCSI DEVICE |
| I/O REQUEST OF HOST SYSTEM ALREADY ACCEPTED | BEFORE ISSUANCE FROM DEVICE DRIVER OF BUS PESET/ RETRY TO BE EXECUTED WHEN PRESET I/O MONITOR TIME IS LAPSED AFTER I/O REQUEST, SCSI-ID IS TRANSFERRED TO NORMAL CONTROLLER 40 TO RESPOND TO RETRY | USED BY FAILED CONTROLLER 30 (USAGE OF BUS OF ANOTHER SCSI DEVICD CANNOT BE DISCRIMINATED) | (SCSI BUS MAY POSSIBLY BE UNSTABLE: I/O OF SCSI DEVICE IS FINISHED IMMEDIATELY BEFORE COMPLETION OF RESETTING OF FAILED SCSI PORT AND THEN HOST ISSUES I/O PROCESS REQUEST TO FAILED CONTROLLER 30)<br><br>[FAILED CONTROLLER]<br>TRANSFER SCSI-ID DURING HANG-UP OF SCSI BUS. SCSI BUS HANG-UP IS RELEASED BY RESETTING FAILED SCSI PORT AND NORMAL CONTROLLER 40 RESPONDS TO RETRY |

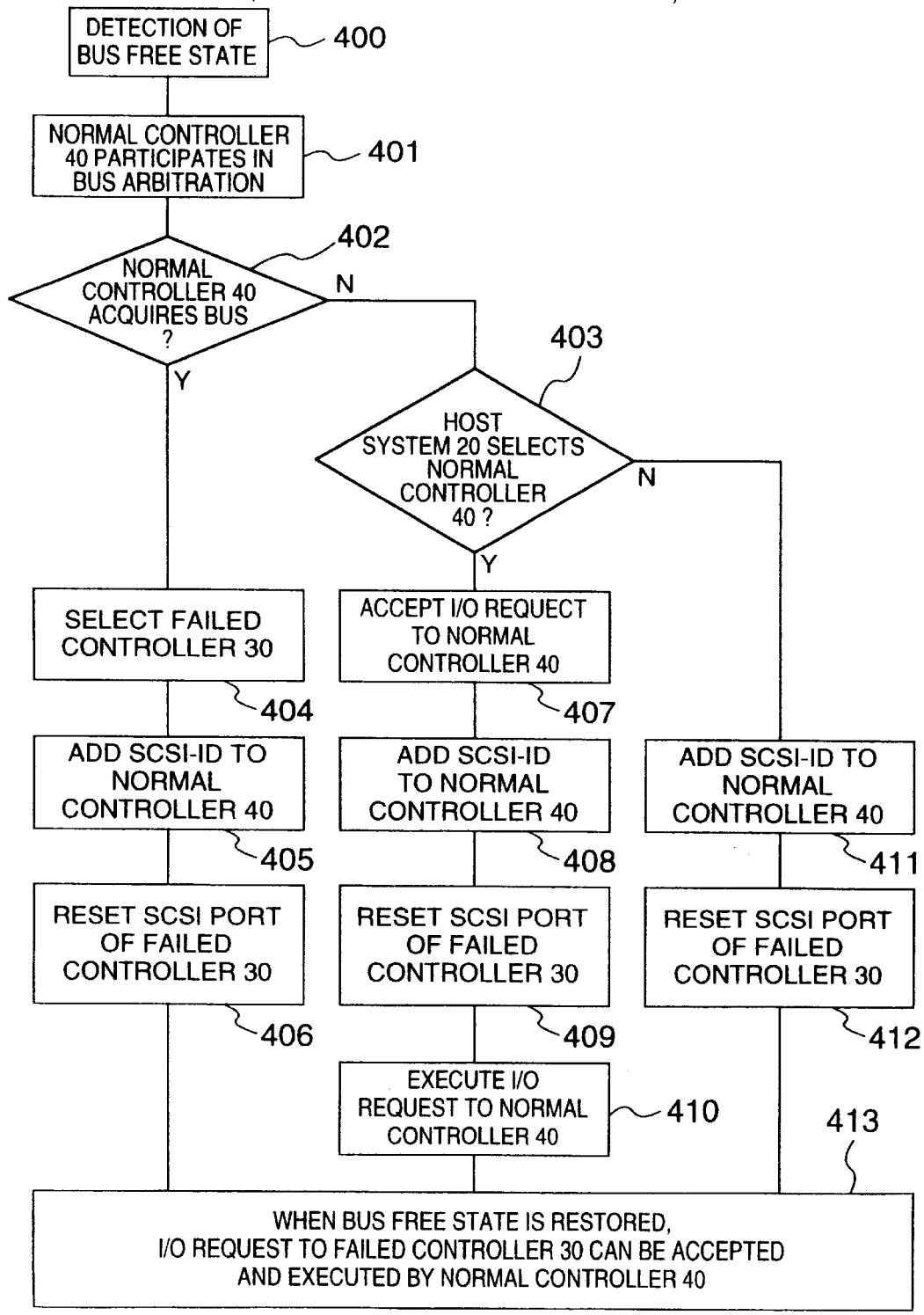

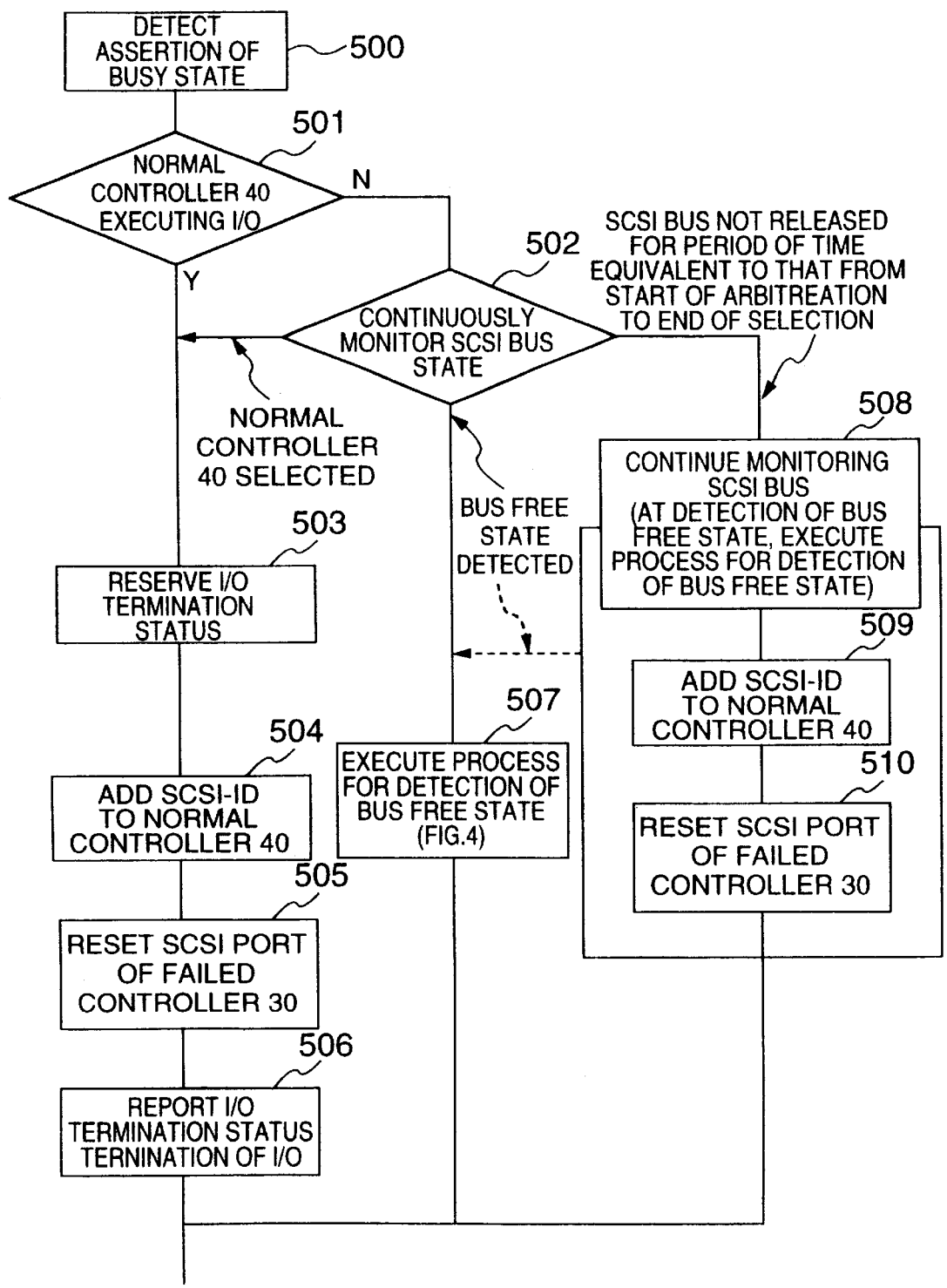

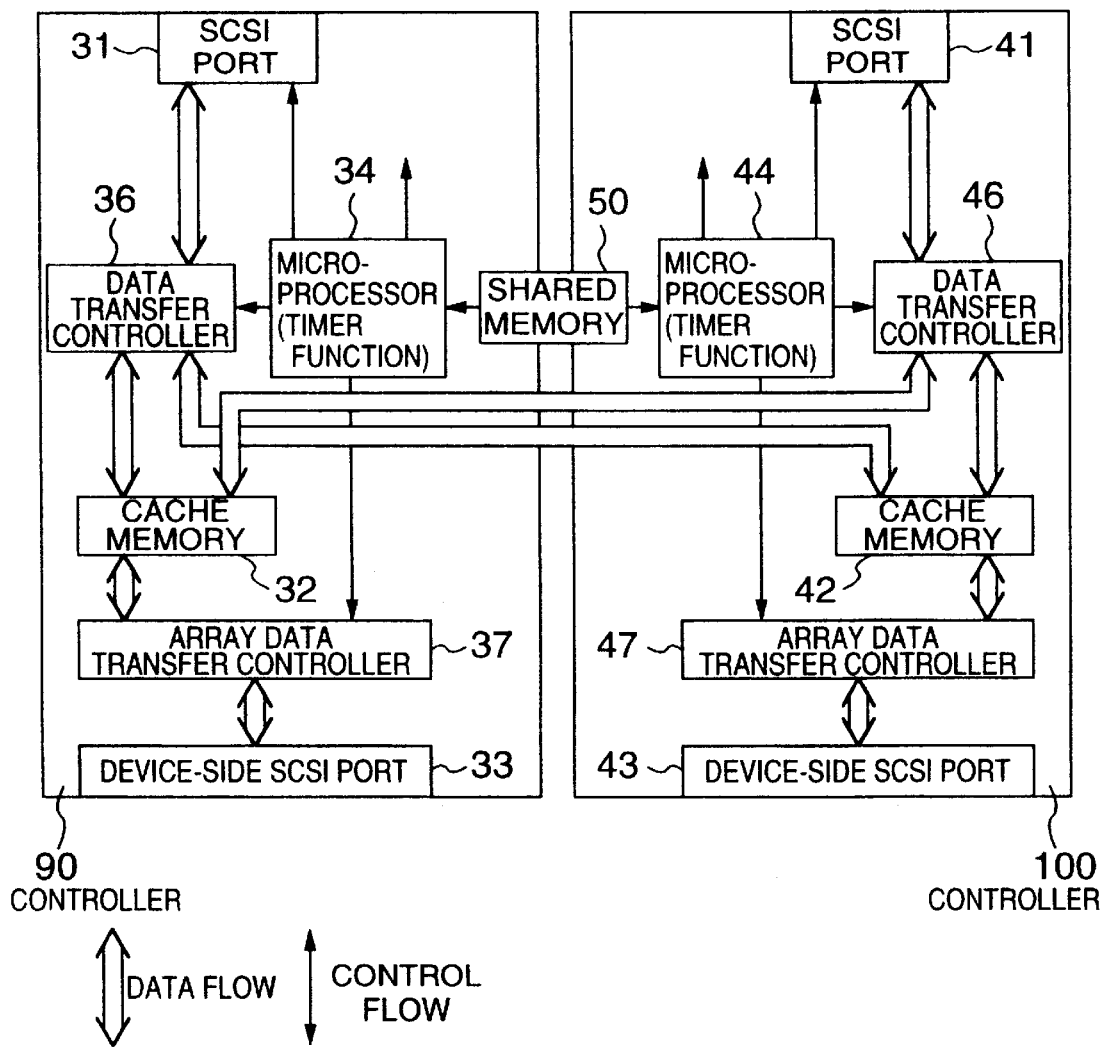

SCSI-ID TRANSFER IN CONFIGURATION NOT
HAVING PORT ADDRESS RESETTING FACILITY
(EXEMPLE OF I/O TRANSFER BY CONTROLLER
100 AT FAILURE IN CONTROLLER 90)

EXTERNAL STORAGE

This is a continuation of application Ser. No. 08/738,590 filed Oct. 29, 1996.

BACKGROUND OF THE INVENTION

The present invention relates to a technology to guarantee high reliability in operation of a plurality of controllers for input/output (I/O) devices in a computer system, and in particular, to a method of redundantly arranging controllers capable of transferring a process therebetween without intervention of the user and host systems when failure occurs in one of the controllers in an external storage subsystem adopting a Small Computer Systems Interface (SCSI) in which the controllers are arranged at least in a duplicated configuration and the controllers can be accessed from the host systems.

In a system configuration employing the SCS in which a plurality of controllers and a storage shared between at least two controllers are connected by an interface cable in a daisy chain to the host systems, the plural controllers respectively have different port addresses such as SCSI-IDS. Ordinarily, these controllers process I/O requests designated according to pertinent port addresses specified by the host systems.

JP-A-4-364514 describes a system in which the controllers are arranged in a multiplex configuration such that I/O requests from a host apparatus to storages connected to the plural controllers are processed at a high speed. In such a conventional system, when failure occurs in one of the controllers, and when the host system alters the specification of the controller to execute the I/O request, it is possible that the I/O request is processed by a normal controller. However, in a system in which the host system and the plural controllers are connected to each other in a daisy chain, considerations have not been given to a procedure in which when failure occurs in a controller, the process is transferred to a normal controller for the execution thereof without intervention of the host system.

After issuing an I/O request to a controller, the host system ordinarily monitors termination of the I/O request by a timer in the host system. When the I/O is not terminated even when the monitor time predetermined by the host system lapses after the issuance of the I/O request, the host system assumes the state temporarily as an error. Conducting processes such as bus recovery process of an SCSI bus, the host system tries to re-issue the same I/O request with specification of the port address of the failed controller.

When the controller does not respond to the re-issued I/O request, the host system regards the state as a permanent error and hence does not thereafter issue any I/O request to the failed controller. Upon failure of a controller in the conventional system, when the host system recognizes the permanent error, the data process thereof is interrupted. Therefore, even when there are disposed a plurality of controllers, user intervention is required to continuously execute the data process of the host system when failure occurs in the Pertinent controller.

Furthermore, when there are disposed a plurality of host systems, and when a controller fails and enters a hang-up situation with the bus occupied by the failed controller, another data process being executed between another host system and another controller is also interrupted. User intervention is also required to recover the interrupted data process.

SUMMARY OF THE INVENTION

It is therefore an object of the present invention to provide a failure recovery method and system in which when a failure occurs in a controller, the process thereof is transferred to a normal controller to continuously perform the data process without any intervention by the host system or user.

Additionally, when the failed controller has not yet received the I/O request from the host system and hence the error has not been assumed, it is necessary to possibly suppress I/O requests to the failed controller to prevent an abnormal operation. Consequently, in accordance with the present invention, the transfer of the port address and control information is executed after suppressing an event in which the host systems issue I/O requests thereto.

To achieve the object above according to the present invention, a normal controller has a function to receive control information of the failed controller and a function to reference the port address of the failed controller to add the contents thereof to its own port address. Furthermore, the normal controller possesses a function to reset the port address in the failed controller to thereby erase the port address.

Due to these functions, the normal controller can receive the port address and control information of the failed controller and accept and execute the I/O request issued to the failed controller. In the operation, a method may be employed in which the port address is reset by the pertinent failed controller.

Moreover, according to the present invention, there is disposed a function that the normal controller monitors a bus such as an SCSI bus upon detection of the failure to thereby decide whether or not the failed controller has already received the I/O request from the host system. When the failed controller has already received the I/O request from the host system, the transfer of the port address and control information of the failed controller is terminated to prevent the host system from recognizing the permanent error so as to continue the process of the host system without any intervention by the user or host system.

In addition, when the normal controller is executing an I/O process upon detection of a failure in a controller, it is assumed that the failed controller does not yet receive the I/O request from the host s:iste'M. According to the present invention, there is provided a function to detect the condition such, that the transfer of the port address and control information of the failed controller is accomplished during the I/O process execution of the normal controller.

As a result, I/O requests from the host system to the failed controller can be suppressed until the port address transfer process is completed. In addition, when a bus such as an SCSI bus is not being used by any controller upon detection of the failure, it is considered that the failed controller has not yet received the I/O request from the host system. According to the present invention, there is provided a function in which the condition is detected and the normal controller selects the failed controller such that the transfer of the port address and control information is executed after the selection is accomplished. Due to this function, I/O requests from the host system to the failed controller can be suppressed until the port address transfer process is completed. Owing to adoption of the construction of this type, in a situation in which a failed controller have received an I/O request and the execution of the I/O process has not been terminated with a bus such as an SCSI bus kept exclusively reserved by the failed controller, a normal controller detects the state, completes reception of the port address and control information, and resets the failed controller within the I/O monitor time of the host system. This makes it possible that any subsequent I/O requests to the failed controller can received for execution thereof by the normal controller. As a result, the system can respond to the I/O request re-issued from the host system and hence the interruption of the process of the host system as well as the inhibition of issuance of I/O requests from the host system can be prevented.

Moreover, upon detection of a failure in a controller, the normal controller can suppress I/O requests from the host system to the failed controller. Therefore, when the failed controller has not yet received the I/O request, the host system need not recognize the error and any subsequent I/O requests can be received by the normal controller, thereby implementing the nonstop system operation.

BRIEF DESCRIPTION OF THE DRAWINGS

These and other objects and advantages of the present invention will become apparent by reference to the following description and accompanying drawings wherein:

FIG. 2 is a diagram of processing sequence of host system at failure of a controller in the embodiment of FIG. 1;

FIG. 3 is a diagram briefly showing processing to be executed depending on states of the disk subsystem in the embodiment of FIG. 1;

FIG. 4 is a flowchart of processing executed upon detection of the controller failure, specifically, processing executed when the SCSI bus is in the bus free state in the embodiment of FIG. 1;

FIG. 5 is a flowchart of processing executed upon detection of the controller failure, specifically, processing executed when the bus is in use in the embodiment of FIG. 1;

FIG. 6 is a hardware configuration diagram of another embodiment according to the present invention.

DESCRIPTION OF THE PREFERRED EMBODIMENTS

Description will now be given in detail of an embodiment according to the present invention.

Figure 1:
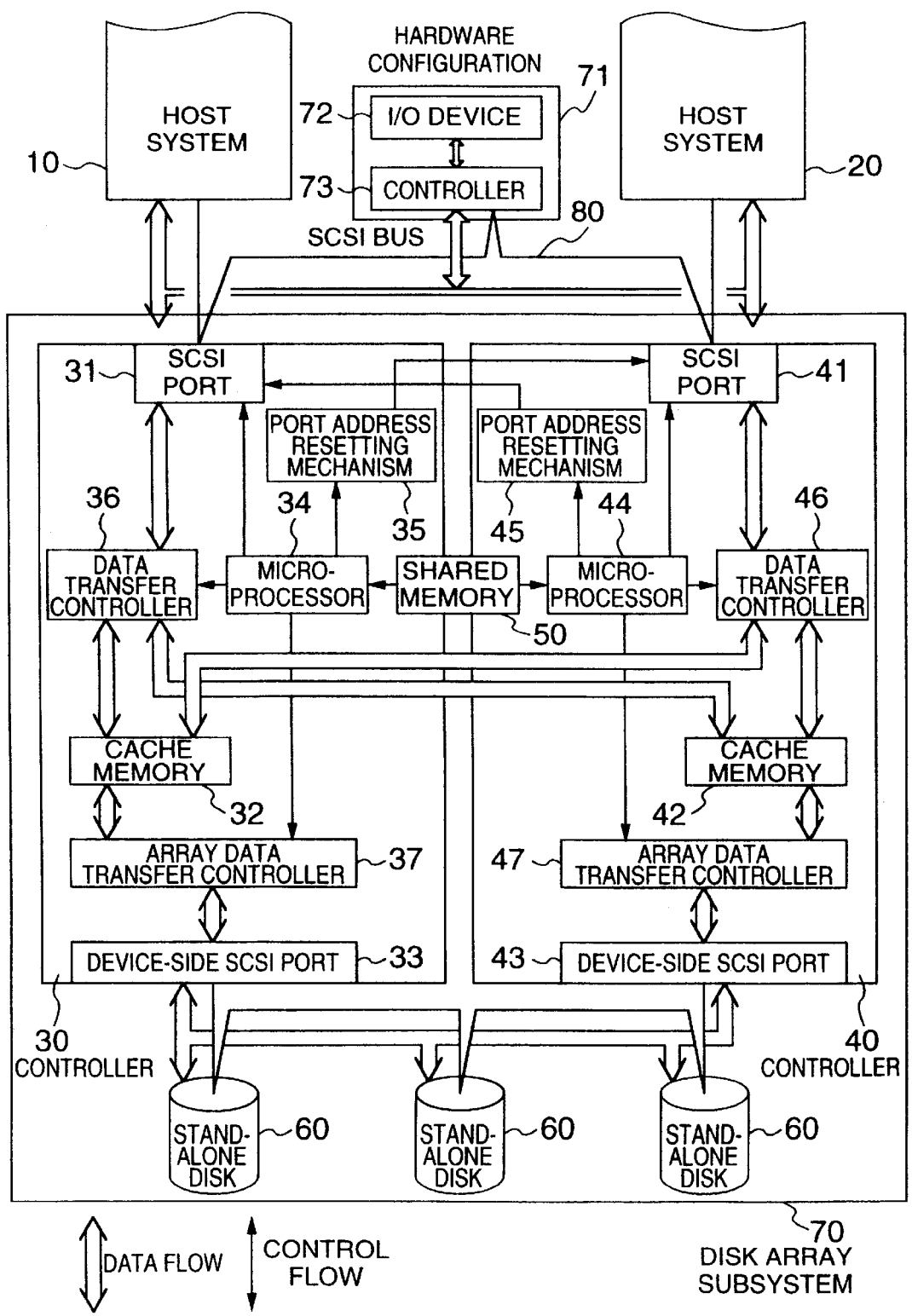
FIG. 1 is a hardware configuration diagram showing an embodiment of the present invention.

In FIG. 1, reference numerals 10 and 20 indicate host systems as central processors to conduct data processing and a numeral 70 denotes a disk array subsystem as a peripheral unit in a dual controller structure. In the constitution of the disk array subsystem 70, a numeral 60 designates standalone disks for storing therein data of the host systems, numerals 30 and 40 are controllers to supervise data transfers between the host systems 10,20 and the standalone disks 60, and numeral 50 stands for a shared memory to transmit information between the controllers 30,40. Reference numeral 71 indicates another peripheral unit including an input/output (I/O) device 72 and a controller 73 to control the I/O device 72.

The host systems 10 and 20 are connected via an SCSI bus to the controllers 30, 40, and 73. In the constitution of the controller 30, numeral 31 indicates an SCSI port to control an SCSI bus on the host system side, numeral 32 is a cache memory, numeral 33 denotes a device-side SCSI port to control the SCSI bus connecting the standalone disks to the controller 30, numeral 34 designates a microprocessor to control overall operations of the controller 30, numeral 35 is a port address resetting facility to reset the SCSI port of the controller 40, numeral 36 is a data transfer controller to execute a data transfer between the host system 10 and the cache memory 32, and numeral 37 indicates an array data transfer controller to execute a data transfer between the cache memory 32 and the standalone disk 60.

The data transfer controller 36 has a function to write, when transferring data from the host system 10 to the cache memory 32, the contents of data in the cache memory 42 of the controller 40 as well. In addition, the array data transfer controller 37 possesses a function to generate redundant data for data buffered in the cache memory 32. This function can also be employed to restore data.

The controllers 30 and 40 mutually have the same configuration. Specifically, for each constituent element of the controller 30, a reference number obtained by adding ten to the reference number of the constituent element indicates a partner or associated constituent element in the controller 40. The port address resetting facility 45 can reset the SCSI port 31 of the controller 30. The port address resetting facilities 35 and 45 reset port addresses, i.e., SCSI-IDs preserved by the SCSI ports 41 and 31 in the respective controllers 30 and 40. According to the SCSI standards, the SCSI-IDs can be erased in the next arbitration phase.

In addition, since the data transfer controller 36 has a function to write data in the cache memory 32, any data items transferred from the host systems 10 and 20 are redundantly buffered in the respective cache memories 32 and 42. Accordingly, even when a failure occurs in one of the controllers, the remaining controller can receive the process of the failed controller to execute the process using the data in its own cache memory.

The I/O process flow will be described according to an example in which the host system 10 achieves a data transfer via the controller 30. The host system 10 issues an I/O request with an SCSI-ID designating the controller 30. In the controller 30, the SCSI port 31 keeping the SCSI-ID therein receives the I/O request and then passes the request to the microprocessor 34. The microprocessor 34 analyzes the I/O request and then instructs the data transfer controller 36 to execute a data transfer between the host system 10 and the disk 60.

The transfer data is provisionally buffered in the cache memory 32 and is then written also in the cache memory 42 in contemplation of a possible failure in the controller 30. In this connection, the SCSI-ID is set by the microprocessor 34 at initialization of the SCSI port 31, for example, when the system is powered. The SCSI-ID is saved in the shared memory 50 at the same time. Also stored in the shared memory 50 is control information so that the process can be continuously, executed by a normal controller when one of the controller system fails in the dual controller configuration.

Referring now to the process sequence of the host system at failure of the controller shown in FIG. 2, description will be given of a method of continuing an I/O operation of the host system 10 according to the present invention.

First, the internal construction of the host system 10 will be described, In FIG. 2, numeral 81 is an application program for executing data processing to perform various requests from the user, numeral 82 denotes a file system for keeping therein data structure and controlling I/O requests, numeral 83 indicates a device driver for converting an I/O request into a request mode suitable for a peripheral unit, numeral 84 stands for an SCSI card for transmitting an I/O request to the SCSI bus, numeral 85 is a transfer I/O buffer, and numeral 86 designates a system log in which failure information of the host systems is accumulated.

Next, description will be generally given of 5 the processing of the host system 10 when a failure occurs in the controller 30 of the disk subsystem. Receiving an I/O request occurring in the application 81, the file system 82 issues an I/O request to the SCSI bus 80 via the device driver 83 and SCSI card 84. On receiving the request, when the controller 30 detects a failure in the disk subsystem, the controller 30 reports Check Condition for the I/O request.

Next, the device driver 83 issues a Request Sense command to receive Sense Data which is detailed failure information. According to the Sense Data, the device driver 83 recognizes the state of the controller 30. As a result, the driver 83 issues again (retries) the same I/O request. Since the failed controller 30 cannot either execute the re-issued I/O request, the device driver 83 instructs an operation to discard the process associated with the I/O request and repeats the operation, for example, by Retry after an Abort message. After this operation, the driver 83 recognizes the state as a permanent error to notify the condition to the file system 82.

Receiving the permanent error report, the file system 82 does not thereafter issue any I/O request to the disk subsystem 70. The file system 82 then erases non-reflection data of the I/O buffer 85 and records a failure occurrence in the system log, and then sends an error message via the application program 81 to the user. Consequently, the integrity of updated data cannot be preserved between the application program 81, file stem 2, and disk subsystem depending on cases. Consequently, in any case to which the present invention is not applied, the user is required to stop the application program and the like to restore the disk subsystem so as to thereafter execute again a sequence of processes possibly having caused the mismatching of data in the host system.

As another example of general processing, there exists a case in which the controller 30 cannot report Check Condition to the device driver 83 even when failure occurs. Namely, the controller 30 does not notify the occurrence of the failure to the device driver 83. On this occasion, the device driver 83 checks the state of the disk subsystem by monitoring the state according to a fixed period of time indicated by a timer. When the response is not received within the fixed period of time, the device driver conducts, as in the example above, the process beginning at the re-issuance (retry) of the same I/O request.

Referring to FIG. 1, description will be given of an advantageous feature in which the I/O process can be continued without conducting the user operation in accordance with the present invention. The controllers 30 and 40 update monitor information items of the respective controllers in the shared memory 50 at a fixed interval of time; moreover, the controllers mutually reference monitor information thereof.

When the controllers 30 and 40 are respectively receiving I/O requests issued respectively from the host systems 10 and 20, and when a failure occurs in the controller 30, the monitor information of the controller 30 in the shared memory 50 is updated by the controller 30 to information indicating the failure, or the information is not updated even when a fixed period of time lapses. Referencing the monitor information in the shared memory 50, the controller 40 detects the failure of the controller 30, reads the SCSI-ID of the SCSI port 31 and control information of the controller 30 from the shared memory 50, and adds by the microprocessor 44 the SCSI-ID of the SCSI port 31 to the SCSI port 41.

Additionally, using the SCSI port resetting facility 45, the controller 40 erases the SCSI-ID possessed by the SCSI port 31. This enables the SCSI port 41 to accept an I/O request issued from the host system 20 and an I/O request issued from the host system 10 so thale' the retry of the host system 10 is received for execution thereof by the controller 40.

When the retry is normally executed, a normal execution of the I/O request is reported to the file system 82 and the processing of the host system 10 is normally continued. The control information includes transit information in relation to transfers of data from the cache memories 32 and 42 to standalone disks 60. Consequently, upon receiving the control information, the controller 40 can transfer, in place of the controller 30, the duplicated data written in the cache memory 42, as alternative data of the Write data maintained as non-reflection data in the cache memory 32.

Since the method of failure detection and control information transfer of the controller 30 is not the inherent characteristic of the present invention and has already been described in detail in the Japanese Patent Application No. 7-139781. (filed on Jun. 7, 1995) by the applicant of the present invention, description thereof will be avoided.

For the transfer by the controller 40 of the SCSI-ID of the SCSI port 31 to the SCSI port 41 and the transfer of control information of the controller 30 to the controller 40 described above, the associated processing is required to be appropriately accomplished according to the state of the controller 30. Otherwise, the transfers cannot be correctly carried out. According to the present invention, the status of the failed controller 30, more specifically, the state of reception by the failed controller 30 of the I/O request from the host system is determined on the basis of the usage state (signal state) of the SCSI bus.

In the following examples, description will be given of a case in which a failure takes place in the controller 30 of FIG. 1 and the process is continued by the normal controller 40.

Referring next to FIG. 3, description will be given of processing to be executed according to the state of the disk subsystem.

In general, it is difficult to completely forecast operation to be achieved by the failed controller when an I/O request is received from the host system 10. Therefore, when the failed controller 30 has not yet received the I/O request from the host system 10 when the failure of the controller 30 is detected by the controller 40, the transfer process of the SCSI-ID including the addition of the SCSI-ID to the SCSI port 41 and the resetting of the SCSI port 31 is executed as early as possible so that the controller 40 receives the I/O request.

However, when an I/O request is issued from the host system 10 with specification of the SCSI-ID during the transfer process of the SCSI-ID, the controllers 30 and 40 possess the same SCSI-ID and hence the operation of the SCSI bus becomes unstable. In this situation, according to the present invention, there is provided a method in which the SCSI bus 80 is dedicatedly occupied by one controller during the SCSIID transfer process so as to suppress the I/O request issuance from the host system 10.

In accordance with the present invention, the controller 40 monitors the utilization status (signal state) of the SCSI bus 80 to decide whether or not the controller 30 has already received the I/O request from the host system 10, thereby executing a process associated with the decision.

In one of the utilization statuses of the SCSI bus 80, the SCSI bus 80 is possibly in the bus free state when a failure is detected in the controller 30. In this case, the SCSI bus 80 is possibly in the bus free state. Since the controller 30 has not yet received the I/O request, the controller 40 executes a host operation (the initiator operation) such that the controller 40 selects the controller 30 to exclusively occupy the SCSI bus 80. This makes it possible to suppress the issuance of an I/O request from the host system 10 such that the controller 40 conducts the transfer of the SCSI-ID during this period.

In one of the utilization statuses of the SCSI bus 80, it may be possible that the controller 40 is executing an I/O process through the SCSI bus 80 when a failure is detected in the controller 30. In this situation, it may be possible that the controller 40 is executing an I/O process through the SCSI bus 80. On this occasion, the controller 30 has not received the I/O request and hence the SCSI bus 80 is set to the bus free state at termination of the I/O process and an I/O request may possibly be issued from the host system 10. To overcome this difficulty, the controller 40 also completely executes the SCSI-ID transfer during the execution of the pertinent I/O process. If the SCSI-ID transfer is not completed during the execution of the pertinent I/O, the controller 40 does not send the report of the I/O termination status until the ID transfer is completely finished.

In one of the utilization statuses of the SCSI bus 80, the SCSI bus is possibly being used when a failure is detected in the controller 30. In this case, the system is in a state in which the arbitration or selection is being executed according to the SCSI standards, a state in which another SCSI device connected to the SCSI bus 80 is using the SCSI bus 80, or a state in which the controller 30 has already received the I/O request from the host system 10.

In this situation, the controller 40 monitors the BSY signal of the SCSI bus 80. In association with the monitor period, when the BSY signal continues for a period of time equal to or more than the period of time in which the arbitration phase is changed via the selection phase to the message out phase according to the SCSI standards, it can be decided that the signal is the BSY signal indicating an I/O process in execution, not the BSY signal of the bus mastership arbitration. After the signal decision, the controller 40 executes the SCSI-ID transfer process at a high speed.

If another SCSI device is using the SCSI bus 80, the controller 30 has not received the I/O request. Therefore, the controller 40 achieves the transfer process at a high speed while another SCSI device is using the SCSI bus 80.

If the controller 30 has already received the I/O request from the host system 10, the failed controller 30 has already stopped its operation with the SCSI bus 80 exclusively possessed by the controller 30. Since the device driver 83 is monitoring the I/O operation by the internal timer, the controller 40 is required to execute the SCSI-ID transfer before the host system 10 conducts the Bus Reset and Retry so that the controller 40 responds to the Retry. The monitor period of the controller 40 to monitor the SCSI bus 80 is shorter than the I/O process monitor period of the host system 10. Consequently, the controller 40 is required to completely achieve the SCSI-ID transfer prior to the bus resetting indication from the host system. This can be satisfactorily achieved due to the provision described above.

Referring to FIGS. 4 and 5, description will be given of a procedure to acquire the state of the disk subsystem by monitoring the SCSI bus and an associated procedure of transferring the SCSI-ID.

Description will be given of a case in which the SCSI bus 80 is in the bus free state when a failure of the controller 30 is detected by the controller 40 in FIG. 4.

Since the SCSI bus 80 is in the bus free state (step 400), the controller 40 recognizes that the controller 30 has not yet received the I/O request from the host system 10. The controller 40 then instructs the SCSI port 41 to start the initiator operation to participate in the arbitration of the SCSI bus 80 (step 401).

As a result, when the controller 40 remains in the arbitration (Y in step 402), the controller 40 specifies in the selection phase the SCSI-ID of the SCSI port 31 of the failed controller 30. In this situation, even if a failure occurs in the controller 30, the SCSI port 31 normally functions in most cases. Consequently, there is set a state in which the SCSI port 31 of the controller 30 exclusively occupies the SCSI bus 80 (step 404). In this state, the controller 40 adds the SCSI-ID possessed by the SCSI port 31 to the SCSI port 41 (step 405) and then resets the SCSI port 31 (step 406). The SCSI bus 81 exclusively occupied by the controller 30 is released by resetting the SCSI port 31 and is returned to the bus free state. Thereafter, the controller 40 receives the I/O request from the host system 10 (step 413). The I/O process 5 continue in this way without any intervention by the user.

When the controller 40 cannot remain in the arbitration (N in step 402), it is decided whether or not the controller 40 is selected by the host system 20 in the selection phase (step 403). If the controller 40 is selected by the host system (Y in step 403), there is set a state in which the controller 40 dedicatedly occupies the SCSI bus 80. In this state, the controller 40 receives the I/O request from the host system (step 407) and then provisionally interrupts the processing. The controller 40 adds the SCSI-ID possessed by the SCSI port 31 to the SCSI port 41 (step 408) and then resets the SCSI port 31 (step 409). After resetting the port 31, the controller 40 executes the I/O request from the host system (step 410) and then restores the SCSI bus 80 to the bus free state. At this point, the controller 40 receives the I/O request from the host system 10 (step 413).

If the controller does not remain in the arbitration (No in step 402) and is not selected by the host system (No in step 403), the controller 40 assumes a state in which the controller 30 having received the I/O request from the host system 10 or another SCSI device dedicatedly occupies the SCSI bus 80. In this situation, while the state is kept unchanged, the controller 40 adds the SCSI-ID possessed by the SCSI port 31 (step 411) to the SCSI port 41 and then resets the SCSI port 31 (step 412). If the controller 30 exclusively occupies the SCSI bus 80, the SCSI bus 80 is restored to the bus free state by resetting the SCSI port 31. If another SCSI device dedicatedly occupies the SCSI bus 80, the SCSI bus 80 is restored to the bus free state when the I/O process of the SCSI device is terminated. Thereafter, the controller 40 accepts the I/O request from the host system 10 (step 413).

Referring next to FIG. 5, description will be given of a processing procedure in a case in which the BSY signal of the SCSI bus 80 is asserted at detection of the failure of the controller 30 (step 500).

The controller 40 first determines whether or not the controller 40 is executing an I/O request from the host system (step 501). If this is not the case (No in step 501), the controller 40 continuously monitors the state of the SCSI bus 80 for a period of time equivalent to the period in which the arbitration phase according to the SCSI standards is changed via the selection phase to the message out phase (step 502).

At detection of the failure, if the controller 40 is executing an I/O operation (Y in step 501) or the controller 40 is selected by the host system during the monitor operation of the SCSI bus 80 (left branch in step 502), there is assumed a state in which the SCSI bus 80 is exclusively occupied by the controller 40 and the controller 30 has not received the I/O request. In this state, prior to reporting the termination status of the I/O execution (step 503), the controller 40 adds the SCSI-ID possessed by the SCSI port 31 to the SCSI port 41 (step 504) and then resets the SCSI port 31 (step 505). After resetting the port 31, the controller 40 notifies the I/O termination status and then terminates the I/O operation (step 506).

The SCSI bus 80 is set to the bus free state when the I/O execution process is terminated, and the controller 40 receives any subsequent I/O request from the host system 10. In this fashion, it is possible to continuously execute the I/O process without user intervention.

When the bus free state is detected during the monitor operation of the SCSI bus 80 (central branch in step 502), the process at bus free detection of FIG. 4 is executed.

If the controller 40 is not executing an I/O operation and the SCSI bus 80 is not released during the monitor operation (right branch in step 502), the controller 40 recognizes that the controller 30 or another SCSI device exclusively occupying the SCSI bus is executing an I/O operation. Continuing the SCSI bus monitoring operation (step 508), the controller 40 adds the SCSI-ID possessed by the SCSI port 31 to the SCSI port 41 (step 509) and then resets the SCSI port 31 (step 510).

When the controller 30 exclusively occupies the SCSI bus 80, the bus 80 is returned to the bus free state by resetting the SCSI port 31. When another SCSI device exclusively occupies the SCSI bus 80, the bus 80 is returned to the bus free state when the I/O operation of the SCSI device is terminated. Thereafter, the controller 40 receives the I/O request from the host system 10. If the bus is released before the SCSI port 31 is completely reset (broken line in step 508), there is executed the process at detection of the bus free state shown in FIG. 4.

As a result of the processing procedure, the I/O request from the host system 10 can be executed by the controller 40 when a failure occurs in the controller 30, thereby preventing the permanent error. Consequently, the data processing of the system 10 can be normally continued.

Figure 7:
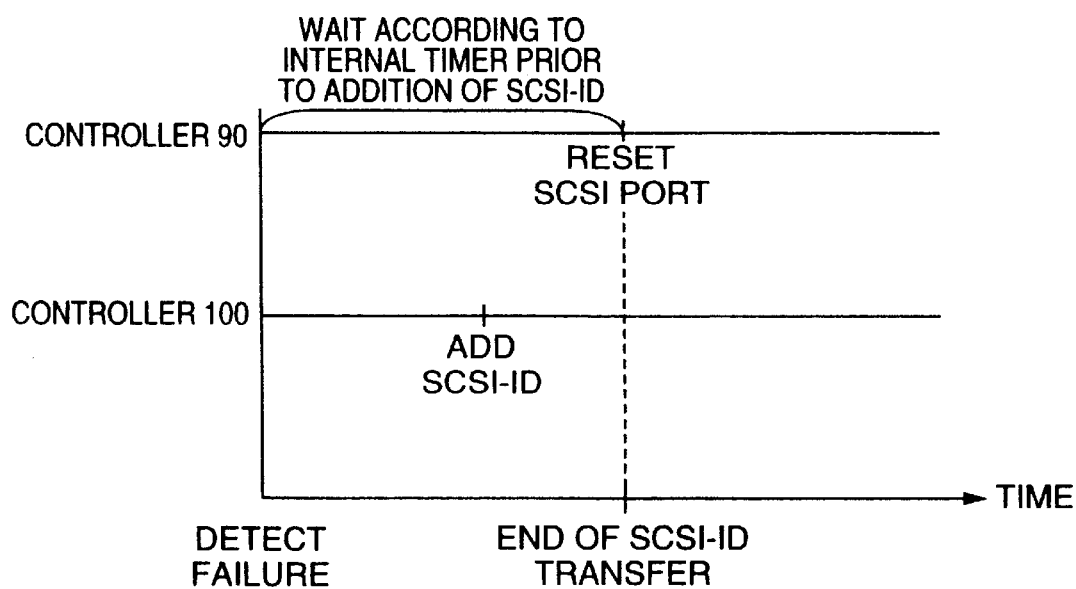
FIG. 7 is a schematic diagram showing a method of implementing the SCSI-ID transfer in the configuration of the embodiment of FIG. 6.

Referring next to FIGS. 6 and 7, description will be given that the present invention can be implemented in a configuration of the controller not including the port address resetting facility.

FIG. 6 is a diagram showing the configuration developed by removing the port address resetting facility from the controller of FIG. 1. Numerals 90 and 100 indicate controllers respectively conducting functions of the controllers 30 and 40 of FIG. 1 and a numeral 50 indicates a shared memory to supply information between the controllers 90 and 100.

In an internal constitution of the controller 90, a numeral 34 is a microprocessor controlling overall operation of the controllers, numeral 31 indicates an SCSI port which can be controlled only by the microprocessor 34, numeral 32 denotes a cache memory, numeral 33 stands for a device-side SCSI port, numeral 36 designates a data transfer controller, and a numeral 37 is an array data transfer controller. The controllers 90 and 100 are of the same configuration. In the following paragraphs, description will be given of an example in which the controller 90 receives an I/O request from the host system 10 of FIG. 1 and the controller 100 receives an I/O request from the host system of FIG. 1. FIG. 7 is a diagram showing an SCSI-ID transfer processing procedure with its abscissa representing lapse of time.

When a failure occurs in the controller 90, the controller 100 detects the failure and then sets at a particular address in the shared memory 50 a failure flag indicating the occurrence of the failure in the controller 90. Thereafter, the controller 100 reads the SCSI-ID of the SCSI port 31 and control information of the controller 90 from the shared memory 50, and adds by the microprocessor 44 the SCSI-ID to the SCSI port 41. In contrast thereto, the controller 90 recognizes its own failure according to the failure flag in the shared memory 50 and enters a wait state in which by use of an internal timer, the controller 90 does not execute its own operation for a period of time equivalent to the period of time in which the transfer processing of the controller 100 is completely executed.

The controller 90 determines through the wait operation the completion of the processing of the controller 100 and then erases by the microprocessor 34 the SCSI-ID possessed by the SCSI port 31. As a result, the SCSI-ID transfer process is terminated and then the SCSI port 41 is enabled to receive the I/O request from the host system of FIG. 1.

Since the SCSI-ID process can be conducted without using the port address resetting facility as described above, the present invention is also effective in the configuration not including the port address resetting facility. It is also to be assumed that when a failure occurs in the controller 90, the microprocessor 34 and SCSI port 31 function normally.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A storage subsystem to be connected to at least one host system, comprising:
   a plurality of controllers each having a unique port address; and
   at least one storage device shared with said plurality of controllers,
   wherein said plurality of controllers are connected to said at least one host system via a bus; and
   when one of said controllers fails, another controller detects a failure in said failed controller, and adds a port address of said failed controller to another normal controller during a bus-occupied state of said bus.

2. A storage subsystem according to claim 1, wherein said another normal controller resets the port address of said failed controller.

3. A failure recovering method for use in a storage subsystem to be connected to at least one of host systems comprising a plurality of controllers which are connected to said host systems via a bus, each of said controllers having a unique port address, said method comprising the following steps:
   detecting a failed controller in said plurality of controllers; and
   adding a port address of said failed controller to a normal controller in said plurality of controllers during a bus-occupied state of said bus.

4. A storage system to be connected to a computer via a network, said storage system comprising:

a storage device for storing data from said computer;

a first controller, connected to said network, for controlling input/output operation of said data to/from said storage device;

a second controller, connected to said network, for controlling input/output operation of said data to/from said storage device;

a first communication port for said network, said first communication port having an identifier and being included in said first controller; and a second communication port for said network, said second communication port having an identifier and being included in aid second controller, wherein said first controller further includes:
means for occupying said network, and
means for assigning said second identifier to said first communication port.

5. A storage system according to claim 4, wherein said network is a SCSI (Small Computer Systems Interface) bus.

6. A storage system according to claim 4, wherein said first controller causes said occupying means to occupy said network when said network is not occupied.

7. A storage system according to claim 4, wherein said first controller causes said occupying means and said assigning means to operate when said second controller is failed.

8. A storage system according to claim 4, further comprising means for deleting said second identifier from said second communication port.

9. A storage system according to claim 4, wherein when said second controller has failed, said first controller occupies said network by means of said occupying means, and assigns said second identifier of said second communication port to said first communication port by means of said assigning means.

10. A storage system according to claim 4, wherein when said second controller has failed while occupying said network by input/output operation of said data between said computer and said second controller, said first controller assigns said second identifier to said first communication port by said assigning means during an occupied state of said network by said second controller.

11. A storage system according to claim 4, wherein data having an identifier is transmitted from said computer, and received at a communication port to which said identifier transmitted with said data is assigned.

12. A storage system according to claim 4, wherein said first and second identifiers are IDs of SCSI.

13. A storage system according to claim 4, wherein after operation of said occupying means and said assigning means, said first communication port receives data having said first identifier and data having said first identifier and data having said second identifier transmitted from said computer.

14. A storage system to be connected to a computer via a network, said storage system comprising:

a storage device for storing data from said computer;

a first controller, connected to said network, for controlling input/output operation of said data to/from said storage device;

a second controller, connected to said network, for controlling input/output operation of said data to/from said storage device;

a first communication port for said network, said first communication port having an identifier and being included in said first controller; and a second communication port for said network, said second communication port having an identifier and being included in said second controller, wherein said first controller further includes:
a circuit which outputs a signal for occupying said network, and
a CPU which assigns said second identifier to said first communication port.

15. A storage system to be connected to a computer via a network, said storage system comprising:

a storage device for storing data from said computer;

a first controller, connected to said network, for controller input/output operation of said data to/from said storage device;

a second controller, connected to said network, for controlling input/output operation of said data to/from said storage device;

a first communication port for said network, said first communication port having an identifier and being included in said first controller; and a second communication port for said network, said second communication port having an identifier and being included in said second controller, wherein said first controller further includes:
a circuit which outputs signals fro inhibiting data output from said computer and from said second communication port, and
a CPU which assigns said second identifier to said first communication port.

16. A storage system to be connected to a computer via a network, said storage system comprising:

a storage device for storing data from said computer;

a first controller, connected to said network, for controlling input/output operation of said data to/from said storage device;

a first communication port for said network, said first communication port having an identifier and being included in said first controller; and a second communication port for said network, said second communication port having an identifier and being included in said second controller, wherein said first controller further includes:
means for inhibiting data transfer among said computer, said first communication port and said second communication port, and
a CPU which assigns said second identifier to said first communication port.

\* \* \* \* \*